J. HEWITT.

Smoothing and Fluting Irons.

No. 5,357. Reissued April 15, 1873.

*Witnesses:*
Edwin James.
N. E. Gordon.

*Inventor:*
John Hewitt.
per J. E. F. Holmead
Attorney.

AM. PHOTO-LITHOGRAPHIC CO. N.Y. (OSBORNE'S PROCESS.)

UNITED STATES PATENT OFFICE.

JOHN HEWITT, OF PITTSBURG, PENNSYLVANIA.

IMPROVEMENT IN SMOOTHING AND FLUTING IRONS.

Specification forming part of Letters Patent No. 135,335, dated January 28, 1873; reissue No. 5,357, dated April 15, 1873; application filed February 25, 1873.

DIVISION A.

*To all whom it may concern:*

Be it known that I, JOHN HEWITT, of Pittsburg, in the county of Allegheny and State of Pennsylvania, did invent certain new and useful Improvements in Smoothing and Fluting Irons and Holders, on which Letters Patent of the United States were granted, bearing date January 28, 1873, and numbered 135,335; and that the following is a full, clear, and exact description of said invention, reference being had to the accompanying drawing and the letters of reference marked thereon making part of this specification, in which—

Figure 1:
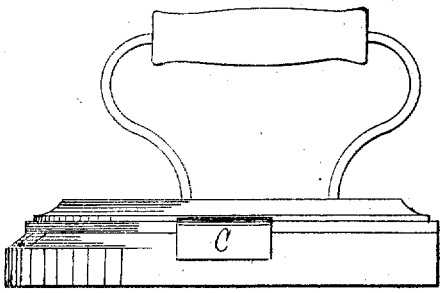
Figure 2:
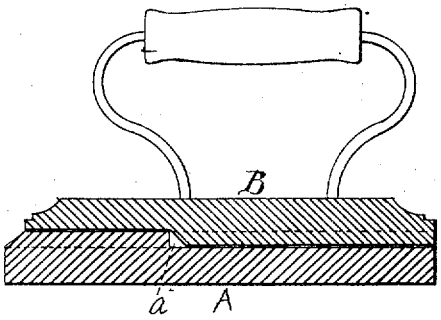
Figure 3:
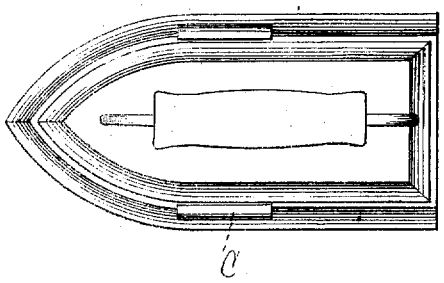
Figure 4:
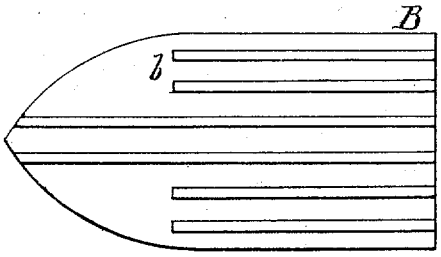
Figure 5:
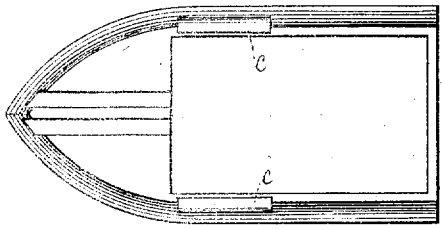
Figure 6:
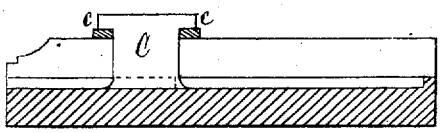

Figure 1 is a side view. Fig. 2 is a longitudinal sectional view. Fig. 3 is a top view of the sad-iron. Fig. 4 is a bottom view of the handle-plate. Fig. 5 is a top view of the lower plate. Fig. 6 is a longitudinal sectional view of the lower plate, showing another style of fastening.

The object of my invention is to so construct the iron that the upper section or part shall be detachable, so as to permit of its under face being corrugated so as to be used in connection with an independent corrugated base-board as a fluting device. The nature of my invention consists in constructing the iron in two sections, the lower being finished as a sad-iron, and the upper section being detachable and having its lower face corrugated. These corrugations are to be so formed—and herein lies the essence of the invention—that their rising lines or ribs shall extend or project beyond the plane of the surface or face of the plate, so that, when the upper part is used in connection with any ordinary corrugated base-board, the ribs of each shall enter and be entirely inclosed in the recesses or grooves of the other, so as to allow of, without tilting the iron, a free forward-and-backward movement of the upper part over the base-board, and permit of the entire surface of each being used in the process of ironing the material that it is desired to flute. When not in use, the corrugations are incased and protected within the recessed face of the sad-iron; and in heating the upper part so as to be used as the ironing-crimper of the fluting device, you have simply to set loosely on the sad-iron the upper part, and which protects the faces of the corrugations from being defaced or injured by contact with the stove or heater. The upper part and base-board which I use being entirely independent and disconnected from each other, the upper part alone is heated, which prevents the base-board from becoming unduly hot, and removes all liability of the garment or article spread thereon being either scorched or burned.

The construction and operation of my invention are as follows: The sad-iron is of the ordinary form, and constructed of any suitable material, in two distinct and independent sections, the sad-iron plate A and fluting section B. These are connected by any suitable attachment, C, so as to form a complete sad-iron, care being taken that the attachment is such as to allow of the ready detachment of the fluting section, as in fluting it is to be used entirely independent of the sad-iron plate A, which, of course, renders any such connection as a hinge-joint or other such attachment wholly impracticable; and besides, a hinge or other such attachment which would require a tongue or lip to project from the under face of the section B would defeat entirely the chief object my invention is designed to accomplish, which is to utilize the entire corrugated faces of the upper section with the corrugated face of an independent base-board as to iron the fluting in contradistinction to pressing, as is the general practice. Of course any projection on the under face of the section B, for attachment or otherwise, would interrupt the forward-and-backward movement always necessary in all ironing processes. In the drawing are shown two methods of attachment, one illustrated at C, Fig. 1, and the other at C, Fig. 6. The attachment in Fig. 1 simply consists in providing by any suitable means the plate A with a clasp having clamping-jaws *c c*, under which the section B slides, and by which it is held in position and direct contact with the sad-iron plate A. The other attachment consists in forming the sad-iron plate A with a tongue, C, which passes up through a slot in one of the grooves of the section B, and which slot passes over the head of the tongue, and the plates are then fastened by any suitable catch passing under the shoulders *c c* of the tongue. This slot in the section B offers no obstruction to the ironing process, as hereinbefore referred to. The lower face of the section B has corrugations throughout its entire length, as clearly shown in Fig. 4. The ridges or ribs *b b* which form the corrugations on the face B project or extend throughout their entire surface beyond the highest section of the plane of the plate, as shown by dotted lines in Fig. 4, and which permits not only of the ribs or ridges *b b* being inserted into the grooves of the base-board throughout their entire width and length, but allows of their utmost freedom of movement therein. The corrugations of the section B and base-board thus meeting, the ribs of the one resting in the recesses of the other allows of an unobstructed ironing motion being given to the upper part, and in consequence of the fact that the part B rests in and works over the base-board in a level or flat position, precisely as the ordinary smoothing-iron rests and works over the ironing-board, the entire surfaces of the corrugated faces of both section B and the base-board are used in ironing the flutes and in imparting the desired gloss thereto. The upper face of the sad-iron plate A is recessed, as shown at *a*, Fig. 2, so as to permit the plates A B to meet and be properly connected for use as a sad-iron. This recess *a* also serves to inclose or incase the ribs *b b* when not required for use as an ironing-crimper for a fluting device, and also when the ironing-crimper is being used serves as a heater for the same. The sad-iron being left on the stove, as the section B becomes cool it is reheated simply by placing it on the sad-iron plate, the ribs *b b* resting in the recess *a* thereof, and thus the part B is heated and reheated without the risk of its ribs *b b* ever being injured or defaced by contact with the stove or other heater.

The great advantage of having an independent plate to use in connection with the corrugated section B in fluting is that, not being a permanent feature of the sad-iron during the process of ironing, it does not become unduly heated, so the instant you cease work with the smoothing-iron the fluting mechanism is ready for work, no cooling time for any feature of the same being required. When the plate—that is, the base-plate—is heated, there is always more or less danger of it burning the material, as the starched fabric when moistened, being more or less gluey, has the tendency, when spread over the ribs, to stick, and consequently scorch or tear.

What I claim as new, and desire to secure by Letters Patent of the United States, is—

An iron consisting of two independent sections, A and B, one having a plain and the other a fluting ironing-face, substantially as hereinbefore described.

In testimony whereof I have signed my name to this specification before two subscribing witnesses.

JOHN HEWITT.

Witnesses:
EDWIN JAMES,
JOS. T. K. PLANT.